(12) United States Patent
Zimmermann et al.

(10) Patent No.: US 7,034,744 B2
(45) Date of Patent: Apr. 25, 2006

(54) METHOD FOR PROCESSING OUTPUT OR BASE SIGNALS FROM A DEVICE FOR DETERMINING A DISTANCE OF AN OBJECT

(75) Inventors: Uwe Zimmermann, Ludwigsburg (DE); Achim Pruksch, Neudenau (DE); Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 92 days.

(21) Appl. No.: 10/466,049

(22) PCT Filed: Jan. 9, 2002

(86) PCT No.: PCT/DE02/00033

§ 371 (c)(1),
(2), (4) Date: Dec. 16, 2003

(87) PCT Pub. No.: WO02/056051

PCT Pub. Date: Jul. 18, 2002

(65) Prior Publication Data

US 2004/0090362 A1   May 13, 2004

(30) Foreign Application Priority Data

Jan. 9, 2001 (DE) ................. 101 00 596

(51) Int. Cl.
*G01S 13/08* (2006.01)

(52) U.S. Cl. .................. 342/145; 342/118; 367/100

(58) Field of Classification Search .......... 342/70, 342/118, 145; 367/99, 100
See application file for complete search history.

(56) References Cited

U.S. PATENT DOCUMENTS

| | | | |
|---|---|---|---|
| 4,382,291 A * | 5/1983 | Nakauchi | 342/27 |
| 4,837,579 A | 6/1989 | Pease et al. | |
| 5,124,954 A * | 6/1992 | Hordijk | 367/99 |
| 5,960,097 A | 9/1999 | Pfeiffer et al. | |

FOREIGN PATENT DOCUMENTS

DE   196 31 590   2/1998
EP   0 215 481   3/1987

OTHER PUBLICATIONS

Ludloff, Albrecht: "Praxiswissen Radar und Radarsignalverarbeitung" 1998, Vieweg&Sohn Verlagsgesellschaft, Wiesbaden XP002197815, p. 6-1, line 1- p. 6-7, line 12; p. 6-13, line 8- p. 6-15, line 8.

* cited by examiner

*Primary Examiner*—Ian J. Lobo
(74) *Attorney, Agent, or Firm*—Kenyon & Kenyon LLP

(57) ABSTRACT

To provide a method of processing output or base signals (S), in particular intermediate frequency output or base signals, from at least one device, in particular at least one radar device, for determining a distance (d), in particular a small distance on the order of magnitude of approximately zero meters to approximately 7 meters, of an object, by which it is possible to obtain from the raw signals, i.e., the output or base signals, distance information with respect to at least one object located in the detection or sensing range of the device, the following steps are provided:
(a) Adaptively determining the background signal ($S_0$) by localized filtering of the output or base signal (S) using at least one localized filter having a specified width (B);
(b) Correcting the background of the output or base signal (s) by
(b.1) subtracting the determined background signal ($S_0$) from the output or base signal (S) and
(b.2) forming a signal, in particular (s=abs (S−$S_0$)), for example, from the difference (S−$S_0$) of the output or base signal (S) and the background signal ($S_0$);
(c) Low-pass filtering, in particular temporal low-pass filtering, of the absolute value signal (s);
(d) Forming a correlation signal (k=korr(s)) by correlating, in particular folding, the low-pass filtered absolute value signal (s) with at least one reference maximum having a half-value width; and
(e) Determining the at least one object maximum (M) using at least one location-variable, adaptive threshold value (t) which may be determined from the correlation signal (k).

21 Claims, 3 Drawing Sheets

METHOD FOR PROCESSING OUTPUT OR BASE SIGNALS FROM A DEVICE FOR DETERMINING A DISTANCE OF AN OBJECT

FIELD OF THE INVENTION

The present invention relates to a method of processing output or base signals, e.g., intermediate frequency output or base signals, from at least one device, e.g., at least one radar device, for determining a distance, e.g., a small distance on the order of magnitude of the close range of a vehicle, of an object.

BACKGROUND INFORMATION

In short range radar (SRR) systems, i.e., in radar devices for determining a small distance, there are various methods for processing and evaluating output or base signals. One method, for example, is based on a threshold value algorithm, taking into account a background signal which is assumed to be constant, and taking into account distant-dependent, fixed threshold values.

However, for objects present which are to be detected or sensed by SRR systems and which move at a high relative velocity, this can result in exceedance of the threshold values at positions where objects are not present.

Such phenomena, which may be subsumed under the concept of the parasitic Doppler effect, result in undesired malfunctions and/or erroneous information. Furthermore, malfunctions and/or erroneous information may also be caused by intrinsic phenomena such as aging effects or temperature influences.

SUMMARY OF THE INVENTION

An object of the present invention is to provide a method by which it is possible to obtain from the raw signals, i.e., the output or base signals, from at least one device, e.g., at least one radar device, distance information with respect to at least one object located in the detection or sensing range of the device.

In this context, an object of the present invention is to process the output or base signals in such a way as to minimize the influence of changes in the output or base signals on the signal amplitudes to be evaluated with respect to the maximum or peak positions.

Consequently, the exemplary method of the present invention also provides a method by which the accuracy of detection may be increased under all conditions.

These objects may be achieved according to the exemplary embodiments of the present invention.

According to the exemplary method of the present invention, a robust method of processing output or base signals from a device for determining a distance of an object is provided which is substantially independent of extrinsic effects (for example, a parasitic Doppler effect when objects having a high relative velocity are present) and intrinsic effects (for example, aging phenomena or temperature influences).

In this context, complicated modifications or changes to the system components in the high-frequency part for suppressing the parasitic Doppler effect or for increasing the accuracy of detection in many applications and operational areas, such as parking aids or pre-crash detection systems, may be dispensed with.

Lastly, the present invention relates to a device, e.g., a radar device, for determining a distance, e.g., a small distance on the order of magnitude of the close range of a vehicle, of an object, which operates according to the method described above.

DETAILED DESCRIPTION

Figure 1:
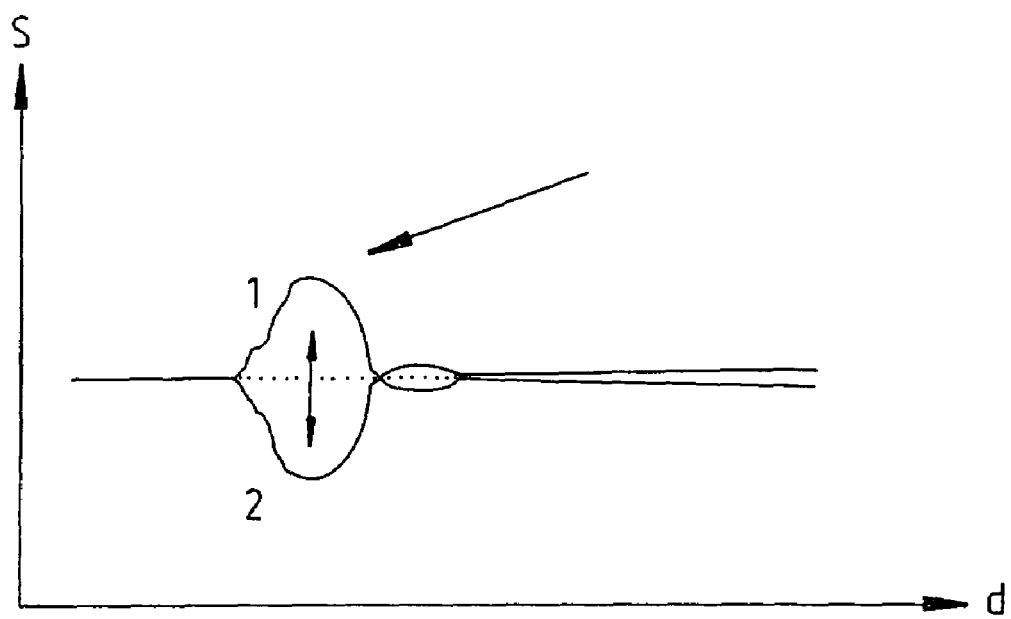
FIG. 1 shows a diagram in which a progression of an intermediate frequency output or base signal at the mixer output of a microwave detector device is plotted against the distance of the object.
Figure 2:
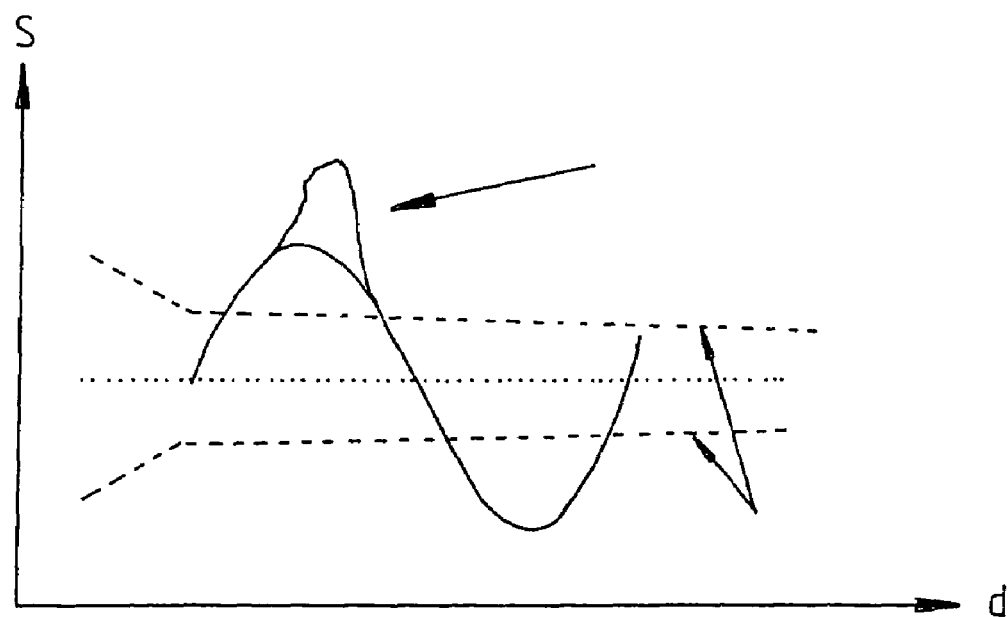
FIG. 2 shows a diagram in which a progression of an intermediate frequency output or base signal at the mixer output of a radar device for a structured background signal is plotted against the distance of the object.

With reference to FIGS. 1 through 6, an exemplary embodiment is illustrated for a method of processing intermediate frequency output or base signals S, which may also be described as intermediate frequency raw signals, using a microwave detector device (see FIG. 1) or a radar device for a structured background signal $S_0$ (see FIG. 2).

Using this method, a distance d of an object may be determined, for example, when parking a motor vehicle, the distance from the curb or the distance of the bumper from the motor vehicle parked in front or behind. In this context, using the exemplary method according to the present invention, small distances in the approximate vicinity of a vehicle, e.g., from about zero meters to about 30 meters, may be determined.

FIGS. 1 and 2 show some characteristics of intermediate frequency output or base signals S (raw signals). These raw signals are present in a low-voltage range, e.g., in an output voltage range of from approximately zero volts to approximately 5 volts, the average value being, e.g., approximately 2.5 volts. Background signals $S_0$, i.e., the signals in the absence of objects, may have a different average value and a more or less strongly pronounced structure, depending on the type of sensor device (e.g., sampling phase detector device in FIG. 1 or radar device in FIG. 2).

In this context, the short range radar (SRR) system functions as a sampling phase detector device (a phase-dependent pulse radar device); i.e., the distance maxima are cancelled for the intermediate frequency as a function of the distance from the object to be detected (see FIG. 1). Positive and negative maxima each result in cancellations at distances of one-fourth wavelength (λ/4), in other words, at distances of approximately 3 millimeters at a carrier frequency of, e.g., approximately 24 Gigahertz.

Specified portions may be superimposed on intermediate frequency output or base signal S (raw signal) by extrinsic phenomena, such as the parasitic Doppler effect (see FIG. 2), and/or by intrinsic phenomena such as aging effects or temperature influences, with the result that background signal $S_0$ may be very highly structured.

According to the exemplary method, the digitalized voltage values of intermediate frequency output or base signal S from the sampling phase detector device first undergo a digital-to-analog conversion before background signal $S_0$ is adaptively determined by localized filtering of output or base signal S, using a localized median filter of a specified width B. According to FIG. 1, object maximum M marked by the arrow exhibits a "backswing response" at "1" due to the sampling phase detector device; at "2" the object is displaced by one-half wavelength ($\lambda/2$) with respect to "1". In FIG. 2, object maximum M marked by the single arrow is located on the structured background caused by the parasitic Doppler effect; fixed, distance-dependent threshold values are marked by the double arrow.

Figure 3:
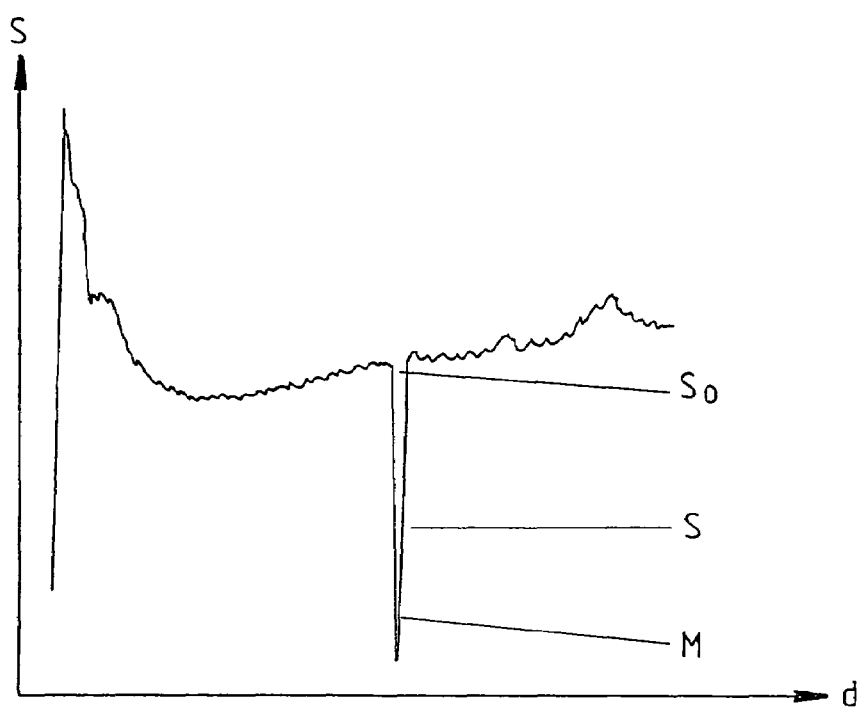
FIG. 3 shows a diagram in which the curve is plotted for the intermediate frequency output or base signal according to FIG. 1 or 2 after digital-to-analog conversion.

To this end, multiple, for example eleven, voltage values for output or base signal S are measured at a specified time over the spectrum, sorted, and the median (as the value in the middle of the window) is selected, width B of localized median filter being adjusted to the maximum width in output or base signal S for the object (see FIG. 3). By this formation of median or average values, object maximum M may be identified (see FIG. 3) and "interfering" maxima are eliminated.

The background for output or base signal S is subsequently corrected. To this end, background signal $S_0$, determined using the localized filtering, is subtracted from output or base signal S, and absolute value signal $s=abs\,(S-S_0)$ is formed from difference $S-S_0$ of output or base signal S and background signal $S_0$. This absolute value formation takes into account the fact that the signal amplitude may fluctuate about the average value due to the properties of the sampling phase detector device, and thus has the advantage that the correction is reliably made even with variable background signals $S_0$ (for a "fixed" constant background, an overall difference may also be formed).

To increase the accuracy of detection under all conditions for the present method, after the background is corrected, temporal low-pass filtering is provided for the absolute value signal s produced. To this end, the positive portions and the negative portions of absolute value signal s produced are summed over multiple measurement cycles, the temporal low-pass filtering being carried out by a floating average value filter having a specified time constant.

Figure 4:
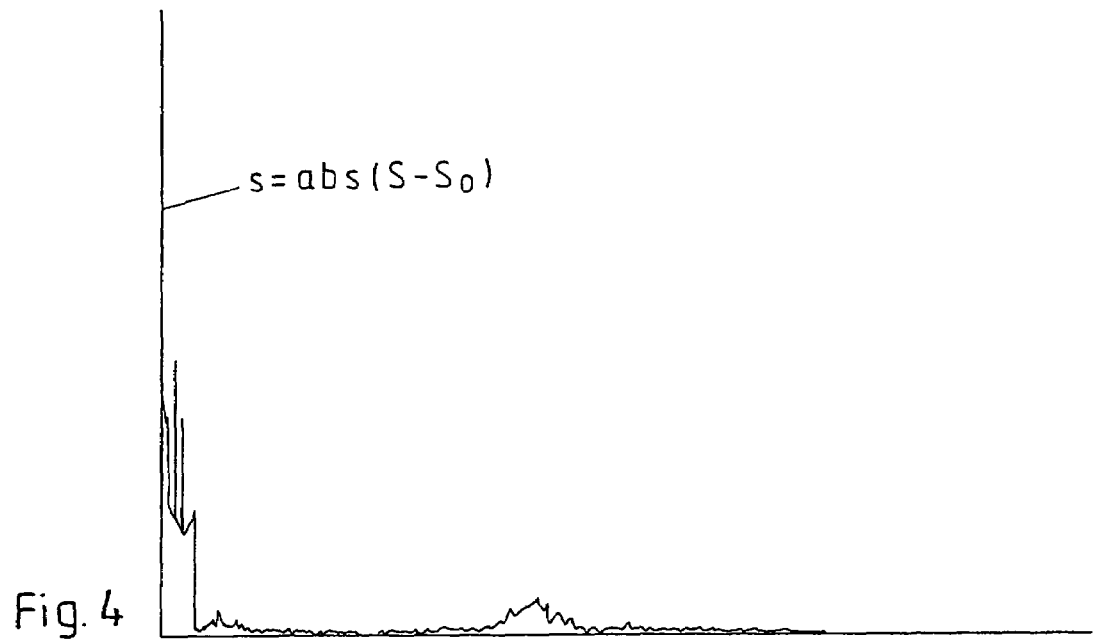
FIG. 4 shows a diagram in which the progression of the absolute value signal from the difference between the output or base signal and the background signal is plotted against the distance of the object.
Figure 5:
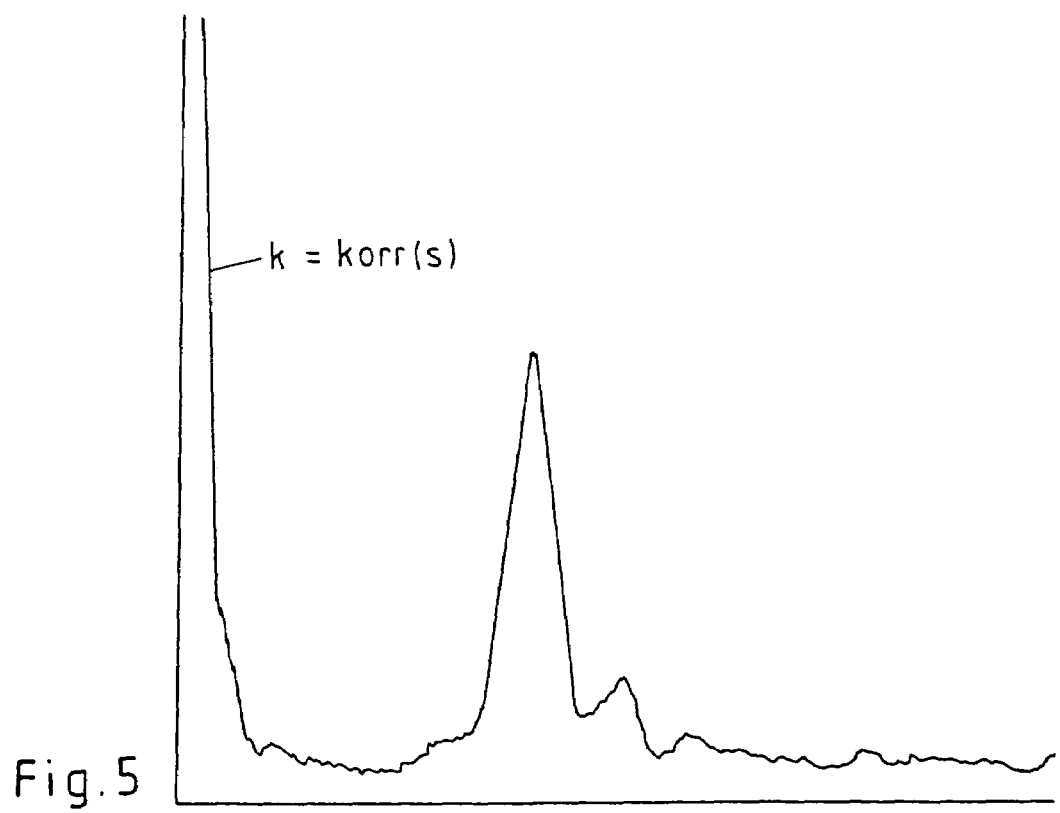
FIG. 5 shows a diagram in which the progression of the correlation signal formed by correlating, e.g., multiplying, the low-pass filtered absolute value signal according to FIG. 4 by a reference maximum having a half-value width is plotted against the distance of the object.

Subsequently, for peak amplification, i.e., for amplifying the maximum according to FIGS. 4 and 5, a correlation signal k=korr(s) is determined by correlating, in the case of the present embodiment by folding, low-pass filtered absolute value signal s with a reference maximum having a half-value width.

Figure 6:
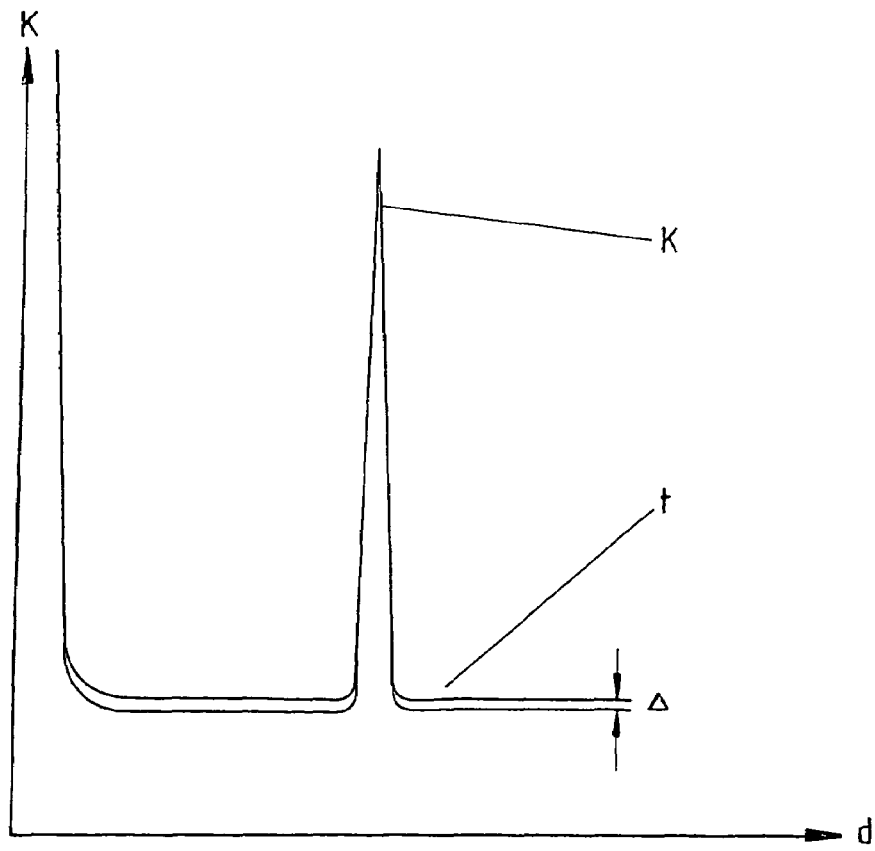
FIG. 6 shows a diagram in which the progression of the signal at a maximum, which is determined using a location-variable, adaptive threshold value that may be determined from the correlation signal according to FIG. 5, is plotted against the distance of the object.

In the subsequent peak detection, i.e., in the determination of the peak locations, object maximum M is determined using a location-variable, adaptive threshold value t (see FIG. 6) which may be determined from correlation signal k (see FIG. 6), location-variable, adaptive threshold value t being acted on by a distance-dependent offset value $\Delta$ (see FIG. 6).

To now obtain the actual distance of the object, the peak location, i.e., the position of object maximum M is associated with a specified distance d of the object using a characteristic curve determined through calibration. Consideration should be made for the fact that the relationship between the signal peak and the distance of the object or of resolution cells (to be briefly described below) is not linear, therefore the calibration characteristic curve may be determined.

This is carried out or performed using resolution cells; i.e., the region for determining distance d of the object is subdivided into a specified number of cells, for example into $2^8=256$ cells (8 bits), which in the embodiment of the present method provide reference measurements in 256 levels; consequently, it is possible to conveniently determine in which of the 256 resolution cells the object is located.

What is claimed is:

1. A method for processing an intermediate frequency signal from at least one device for determining a distance of an object, the method comprising:
   adaptively determining a background signal by providing localized filtering of the signal using at least one localized filter having a specified width;
   correcting a background of the signal by subtracting a determined background signal from the signal, and forming an absolute value signal from an absolute value of a difference between the signal and the background signal;
   low-pass filtering the absolute value signal;
   forming a correlation signal by correlating the absolute value signal with at least one reference maximum having a half-value width; and
   determining at least one object maximum using at least one location-variable, adaptive threshold value which is determinable from the correlation signal.

2. The method of claim 1, wherein the intermediate frequency signal includes an output signal.

3. The method of claim 2, wherein the intermediate frequency signal includes a base signal.

4. The method of claim 1, wherein the device includes a radar device.

5. The method of claim 1, wherein the distance is a small distance on the order of magnitude of a close range of the vehicle.

6. The method of claim 1, wherein the distance is in a range from approximately zero meters to approximately 30 meters.

7. The method of claim 1, wherein the low-pass filtering includes temporal low-pass filtering.

8. The method of claim 1, wherein the correlating is performed by folding a filtered absolute value signal with the at least one reference maximum.

9. The method of claim 1, further comprising:
   providing digital-to-analog conversion of the signal before the background signal is adaptively determined.

10. The method of claim 1, wherein the localized filtering of the signal at a specified time is performed by measuring, sorting, and selecting an average value from voltage values over a spectrum.

11. The method of claim 10, wherein eleven (11) voltage values are used.

12. The method of claim 1, wherein the signal is locally filtered using at least one median filter.

13. The method of claim 1, further comprising:
   adjusting a width of the localized filter to a width of the object maximum of the signal for the object.

14. The method of claim 1, wherein the absolute value signal is low-pass filtered by summing portions in the absolute value signal over determination cycles.

15. The method of claim 1, wherein the low-pass filtering is performed using at least one average value filter having a specified time constant.

16. The method of claim 15, wherein the average value filter is a floating average value filter.

17. The method of claim 1, wherein the location-variable, adaptive threshold value is acted on by at least one distance-dependent offset value.

18. The method of claim 1, wherein the object maximum is associated with a specified distance of the object using at least one characteristic curve determined by calibration.

19. The method of claim 1, wherein a range for determining the distance of the object is subdivided into a specified number of cells.

20. The method of claim 19, wherein the specified number of cells is $2^8$ (256) using 8 bits.

21. A radar device to determine a distance, which is a small distance on the order of magnitude of a close range of a vehicle, of an object, comprising:

an adaptive determining arrangement to adaptively determine a background signal by providing localized filtering of the signal using at least one localized filter having a specified width;

a correcting arrangement to correct a background of the signal by subtracting a determined background signal from the signal, and forming an absolute value signal from an absolute value of a difference between the signal and the background signal;

a low-pass filtering arrangement to low-pass filter the absolute value signal;

a correlating arrangement to form a correlation signal by correlating the absolute value signal with at least one reference maximum having a half-value width; and a determining arrangement to determine at least one object maximum using at least one location-variable, adaptive threshold value which is determinable from the correlation signal.

\* \* \* \* \*

UNITED STATES PATENT AND TRADEMARK OFFICE
CERTIFICATE OF CORRECTION

PATENT NO. : 7,034,744 B2  Page 1 of 1
APPLICATION NO. : 10/466049
DATED : April 25, 2006
INVENTOR(S) : Zimmermann et al.

It is certified that error appears in the above-identified patent and that said Letters Patent is hereby corrected as shown below:

In (57) ABSTRACT, replace correctly published abstract in the following:

ABSTRACT OF THE DISCLOSURE

A method of processing output or base signals, e.g., intermediate frequency output or base signals, from at least one device, e.g., at least one radar device, for determining a distance, e.g., a small distance on the order of magnitude of approximately zero meters to approximately 7 meters, of an object, to obtain from the raw signals, i.e., the output or base signals, distance information with respect to at least one object located in the detection or sensing range of the device. The method includes adaptively determining the background signal by localized filtering of the output or base signal using at least one localized filter having a specified width; correcting the background of the output or base signal by subtracting the determined background signal from the output or base signal and forming a signal, (e.g., $s = abs(S - S_0)$), for example, from the difference $(S - S_0)$ of the output or base signal $(S)$ and the background signal $(S_0)$; low-pass filtering, e.g., temporal low-pass filtering, of the absolute value signal; forming a correlation signal by correlating, e.g., folding, the low-pass filtered absolute value signal with at least one reference maximum having a half-value width; and determining the at least one object maximum using at least one location-variable, adaptive threshold value which may be determined from the correlation signal.

Signed and Sealed this

Eighteenth Day of March, 2008

JON W. DUDAS
*Director of the United States Patent and Trademark Office*